Figure 1:
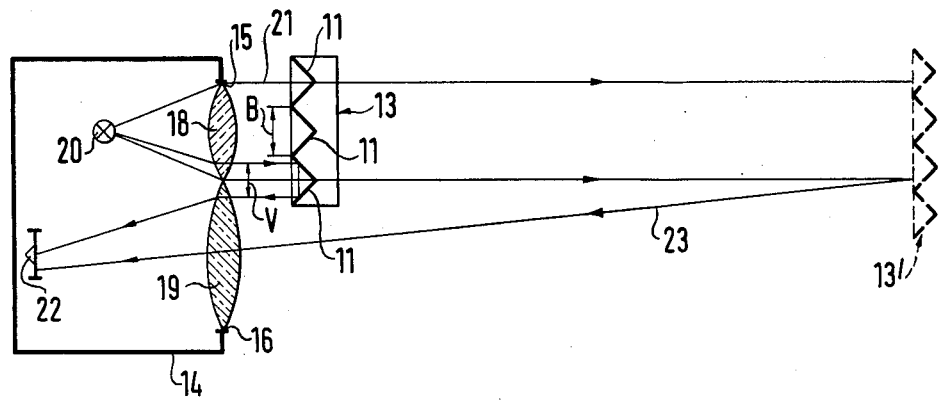

United States Patent [19]

Meinert

[11] Patent Number: 4,816,667

[45] Date of Patent: Mar. 28, 1989

[54] REFLECTION LIGHT BARRIER EMPLOYING ADJACENT LENSES HAVING BORDERING PUPILS

[75] Inventor: Thomas Meinert, Emmendingen, Fed. Rep. of Germany

[73] Assignee: Erwin Sick GmbH Optik-Elektronik, Wladkirch, Fed. Rep. of Germany

[21] Appl. No.: 162,850

[22] Filed: Mar. 2, 1988

[30] Foreign Application Priority Data

Mar. 12, 1987 [DE] Fed. Rep. of Germany ....... 3707986

[51] Int. Cl.$^4$ .............................................. G01V 9/04
[52] U.S. Cl. .................... 250/221; 250/222.1; 340/557
[58] Field of Search ...................... 250/221, 222.1, 239; 340/531, 541, 555–557, 600

[56] References Cited

U.S. PATENT DOCUMENTS 4,224,608 9/1980 Lederer ................................ 340/556
4,310,836 1/1982 Stanzani ............................... 250/221
4,339,660 7/1982 Buchholz et al. ................... 250/221
4,546,246 10/1985 Bechtel ................................ 340/556

Primary Examiner—David C. Nelms
Assistant Examiner—Stephone B. Allen
Attorney, Agent, or Firm—Townsend & Townsend

[57] ABSTRACT

A reflection light barrier has a light transmitter/receiver (14) having two adjacent front lenses (18, 19) for the transmitted and received light respectively. A triple reflector (13′) is arranged at the end of the light barrier path and consists of a plurality of individual triples. In accordance with the invention the length of the boundary line (12) between the pupils is curved so that on arranging the triple reflector (13, 13′) in the near range of the light transmitter/receiver the quantity of light which enters into the receiver pupil (16) as a result of the triple displacement (V) corresponds essentially to the quantity of light received when the triple reflector (13) is arranged in the far region.

9 Claims, 1 Drawing Sheet

U.S. Patent  Mar. 28, 1989  4,816,667

REFLECTION LIGHT BARRIER EMPLOYING ADJACENT LENSES HAVING BORDERING PUPILS

The invention relates to a reflection light barrier comprising a light receiver/transmitter having two adjacent front lenses for the transmitted light and the received light respectively and also a triple reflector having a plurality of individual triples arranged at the end of the light barrier path, wherein the pupils of the front lenses at least approximately border on one another.

For reflection light barriers in which the transmitter and receiver are arranged in a common housing there are two basic possible solutions.

The first uses the strict autocollimation principle in which the transmitter and receiver have a common pupil and the separation of the transmitting channel and the receiving channel takes place via a dividing mirror which is arranged between the transmitter or receiver on the one hand, and the objective, on the other hand.

Furthermore, it is also already known to use a reflection light barrier with two separate but immediately adjacent pupils for the transmitter and receiver. This light barrier makes use of the fact that the retroreflectors normally used with light barriers, which for example consist of many triple mirror segments or reflecting foils do not reflect the incident light back on itself in an ideal manner, but rather within a scattering angle of greater or lesser size. With two closely adjacent pupils a part of the transmitted light will be reflected into the receiver as a result of the this non-ideal characteristic of the retroreflectors.

Both types of known reflection light barrier are problematic in the near range where one obtains either a very strong receiver signal (autocollimation light barrier), or a very low received signal (light barrier operating with two front lenses).

The object of the present invention is to provide a reflection light barrier of the initially named kind in which, in the case of an undisturbed light barrier path and with the retroreflector arranged in the near range, a received signal is obtained which is of substantially the same size as the received signal obtained when the retroreflector is arranged in the far range.

In order to satisfy this object the invention provides that the base size of the individual triples and/or the length and shape of the boundary line between the transmitter pupil and the receiver pupil is/are so selected that on arranging the triple reflector in the near range of the light transmitter/receiver the quantity of light entering the receiver pupil as a result of the triple displacement corresponds substantially to the quantity of light received when the triple reflector is arranged in the far range.

The thought underlying the invention is thus to be seen in the fact that the beam displacement which is inherently present in each individual triple mirror is consciously exploited when the triple reflector is in the near range, to generate a received signal which exceeds a specific threshold value, in order to deflect a part of the transmitted light in an optically precise manner into the receiver without exploiting the non-ideal scattering effects. In order to exploit this effect, which is basically already known with the known triple reflectors, in such a way that the received signal is approximately the same when the reflector is arranged in the near range as it is when the retroreflector is arranged in the far range, one must however take special measures which either reside in an enlargement of the base of the individual triples or in an extension and shaping of the boundary line between the transmitter pupil and the receiver pupil which is brought about by suitable constructional design.

The constructional measures which are to be carried out in accordance with the invention thus consist in enlarging the individual triples and/or in extension and curvature of the boundary line between the transmitter and the receiver pupils. In order to be able to use commercially available triple mirrors it is preferred, in accordance with the invention, to execute the boundary line between the transmitter pupil and the receiver pupil in a curved shape which can take place in a particular simply manner in that the transmitter pupil is separated from the receiver pupil by a curved boundary line, in particular by a circular boundary line. In accordance with the invention the circular transmitter pupil should in particular be arranged in a complementary circular cut-out of the receiver pupil. With this arrangement the receiver pupil is also expediently of circular shape. As an individual triple mirror pattern generally has an orthogonal arrangement a curved boundary line does not lie parallel to the triple rows whereby statistically considered, individual triple mirrors are repeatedly so arranged at the boundary line that light passes from the transmitter pupil into the receiver pupil directly as a result of the triple displacement. The curvature of the boundary line is such that at least a substantial part of the individual triple mirrors bridge the boundary line and indeed largely independently of the adjustment of the triple reflector relative to the light transmitter/receiver. This represents an important feature of the invention, with the greater length of the boundary line brought about by the curvature additionally being favourable.

The preferred dimensions of the reflection light barrier are such that the circular cut-out extends over an angle of 130° to 170°, in particular over an angle of 140° to 160° and preferably over an angle of approximately 150°. Moreover, the ratio of the diameters of a transmitter pupil to the receiver pupil expediently lies in the range from 1:1.3 to 1:1.7, in particular in the range from 1:1.4 to 1:1.6 and is preferably approximately 1:1.5. Furthermore, the base spacing of the transmitter pupil from the receiver pupil preferably amounts to 0.3 to 0.7, in particular from 0.4 to 0.6 and preferably approximately 0.5 times the receiver aperture.

In a particularly preferred embodiment the separating line between the transmitter pupil and the receiver pupil is described by the smaller of the two radii of the transmitter pupil and the receiver pupil. Since the field angles for the transmitter and receiver (radiation and reception lobes) are generally kept small for a light barrier the aperture errors for the different zones of the receiving objective must be kept small. The same applies to the transmitting objective with the restriction that here a correction of the aperture error in the region of the marginal zone of the objective is sufficient. With these measures the efficiency of the various separating line segments for the system is kept substantially constant. For this reason particular importance is placed on an embodiment in which the aperture error of the transmitting and receiving front lenses is substantially corrected over the full aperture.

Figure 2:
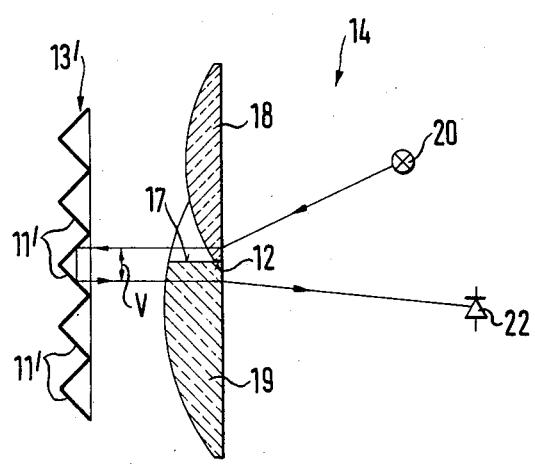
Figure 3:
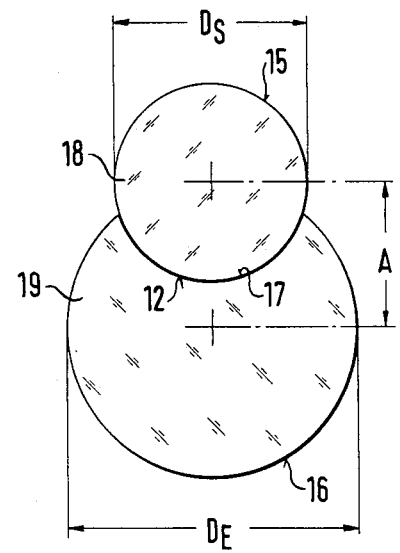

The invention will now be described in the following by way of example and with reference to the drawings in which are shown:

FIG. 1 a schematic side view of a reflection light barrier in accordance with the invention, FIG. 2 a schematic side view of a further advantageous embodiment of a reflection light barrier in accordance with the invention, and FIG. 3 a schematic front view of the subject of FIG. 2.

As seen in FIG. 1 a light source 20 is arranged in a light transmitter/reveiver 14 and illuminates a front lens 18 with a transmitter pupil 15 via a non-illustrated condensor and a diaphragm, and in this way generates a parallel transmitted light beam 21. A front lens 19 for the received light is arranged in the light transmitter/receiver 14 adjacent the front lens 18 for the transmitted light and a photoreceiver 22 is located behind the front lens 19 in the focal plane of a photoreceiver 22.

If, in a reflection light barrier of this kind, a triple mirror 13' is arranged in the far range of the light transmitter/receiver 14, in the manner indicated in broken lines in FIG. 1, then a part of the transmitted light impinging on the reflector 13' is scattered within a narrow reflection lobe. In this manner a scattered light beam indicated for example at 23 can pass through the front lens 19 having a pupil 16 onto the photoreceiver 22 and there generate a corresponding electrical received signal If the customary triple reflector 13 were arranged in the near range of the light transmitter/receiver 14 then only a small quantity of light would enter into the receiver part so that a predetermined switching threshold could no longer be exceeded.

For this reason a triple reflector 13 in accordance with the invention has individual triple mirrors 11 with a widened base B, whereby the triple displacement V is increased, so that even when arranging the triple reflector 13 in the near range of the light transmitter/receiver 14 a sufficient quantity of light enters into the front lens 19 and thus falls on the photoreceiver 22. Accordingly, the signal received when the triple reflector 13 is arranged in the near range is not substantially different from the signal received which is generated when the triple reflector 13 is arranged in the far range. The areal extent of the triple reflector 13 must be such, in accordance with the invention, that it also extends sufficiently far over the front lens 19, or over the receiver pupil 16, that light emerging at the edge of the transmitter pupil 15 can pass via the individual triple mirrors 11 into the front lens 19.

In the embodiment of FIGS. 2 and 3 a commercially available triple reflector 13' with relatively small individual triple mirrors 11 is used so that the triple displacement V alone would not be sufficient in order to compensate for the reflection loss on arranging the triple reflector in the near range of the light receiver/transmitter.

For this reason, in the embodiment of FIGS. 2 and 3, the larger diameter front lens 19 for the received light having the receiving pupil 16 has a circular cut-out 17, in which the smaller diameter front lens 18 for the transmitted light is arranged so that a circular segment-like boundary line 12 is present between the interfitting transmitting and receiving pupils 15, 16. In this way the boundary line between the transmitter pupil 15 and the received pupil 16 is considerably extended. This has the consequence that despite the relatively small triple displacement V light beams which are displaced from a large region of the triple reflector 13' enter into the front objective 19 or the receiving pupil 16. Thus, on arranging the triple reflector 13' in the near range of the light transmitter/receiver 14, a sufficient quantity of light is deflected as a result of the triple displacement V into the receiver part of the light transmitter/receiver 14 despite the relatively small size of the individual triple mirrors 11.

The base distance A of the transmitter pupil 15 from the receiver pupil 16 amounts to ca. one half the receiver aperture $D_E$ of the transmitter pupil, whereas the ratio of the diameter $D_s$ of the receiver pupil to the diameter $D_E$ of the receiver pupil 16 expediently amounts to approximately 1:1.5.

The extension of the boundary line 12 between the pupils 15, 16 is preferred relative to the use of enlarged individual triple mirrors, because in the latter case a relatively precise alignment would be necessary between the retroreflector and the light-receiver. If however numerous individual triple mirrors are located in the region of the curved boundary line then any unfavourable arrangements of the individual triple mirrors are averaged out, so that the retroreflector can be positioned without any particular requirements being placed on the adjustment.

Decisive for a large sensitivity with a small distance of the triple reflector from the light transmitter-receiver are the length and radius of the boundary line 12. If the boundary line 12 is described by the smaller of the two radii (transmitter pupil 15) then one obtains, in addition to the advantageous layout of the boundary line 12, an ideal aperture angle for the transmitter with comparatively small penalties for the receiver aperture.

The arrangement described with respect to FIGS. 2 and 3 has the following advantages:

ideal exploitation of the radiation coil of the transmitter, high sensitivity even at large ranges through large receiver aperture, improved sensitivity with small spacings of the reflector-light transmitter/receiver through a curved boundary line and thereby improved exploitation of the triple displacement with small scattering angles of the reflector, lower sensitivity relative to the diffuse reflecting materials through larger base spacing.

I claim:

1. Reflection light barrier comprising a light receiver/transmitter having two adjacent front lenses for the transmitted light and the received light respectively and also a triple reflector having a plurality of individual triples arranged at the end of the light barrier path, wherein the pupils of the front lenses at least approximately border on one another, characterised in that the base size (B) of the individual triples (11) and/or the length and shape of the boundary line (12) between the transmitter pupil and the receiver pupil is/are so selected that on arranging the triple reflector (13) in the near range of the light transmitter/receiver (14) the quantity of light entering the receiver pupil as a result of the triple displacement (V) corresponds substantially to the quantity of light received when the triple reflector (13) is arranged in the far range.

2. Reflection light barrier in accordance with claim 1, characterised in that the aperture error of the transmitting and receiving front lenses (18, 19) is substantially corrected over the full aperture.

3. Reflection light barrier in accordance with claim 1, characterised in that the transmitter light pupil (15) is separated from the receiver pupil (16) by a curved boundary line (12).

4. Reflection light barrier in accordance with claim 3, characterised in that the separating line (12) between the transmitting pupil (15) and the receiving pupil (16) is described by the smaller of the two radii of the transmitter or receiver pupils (15, 16).

5. Reflection light barrier in accordance with claim 3, characterised in that the circular transmitter pupil (15) is arranged in a circular cut-out (17) of the receiver pupil (16) of complementary shape.

6. Reflection light barrier in accordance with claim 5, characterised in that the receiver pupil (16) is also of circular shape.

7. Reflection light barrier in accordance with claim 5, characterised in that the circular cut-out (17) extends over an angle of 130° to 170°, in particular over an angle of 140° to 160° and preferably over an angle of approximately 150°.

8. Reflection light barrier in accordance with claim 5, characterised in that the ratio of the diameters of the transmitter pupil (15) to the receiver pupil (16) lies in the range from 1:1.3 to 1:1.7, in particular in the range from 1:1.4 to 1:1.6 and is preferably approximately 1:1.5.

9. Reflection light barrier in accordance with claim 5, characterised in that the base spacing of the transmitter pupil (15) from the receiver pupil (16) amounts to 0.3 to 0.7, in particular 0.4 to 0.6 and preferably approximately 0.5 times the receiver aperture.

* * * * *